United States Patent
Hirayama et al.

[11] Patent Number: 6,083,599
[45] Date of Patent: Jul. 4, 2000

[54] PERPENDICULAR MAGNETIC RECORDING MEDIA AND MAGNETIC RECORDING AND REPRODUCING APPARATUS USING THE SAME

[75] Inventors: Yoshiyuki Hirayama, Kodaira; Masaaki Futamoto, Tsukui-gun; Yukio Honda, Fuchu; Kazusuke Yamanaka, Tsukui-gun; Kenya Ito, Hachiouji, all of Japan

[73] Assignee: Hitachi, Ltd., Tokyo, Japan

[21] Appl. No.: 08/922,763

[22] Filed: Sep. 3, 1997

[30] Foreign Application Priority Data

Sep. 4, 1996 [JP] Japan .................................. 8-233911

[51] Int. Cl.[7] ...................................................... G11B 5/66
[52] U.S. Cl. .................. 428/65.3; 428/65.7; 428/694 R; 428/694 T; 428/694 TS; 428/694 TM; 428/336; 428/900; 360/113; 360/128
[58] Field of Search ........................ 428/684 TR, 684 TS, 428/684 TM, 900, 336, 65.3, 65.7; 360/113, 128

[56] References Cited

U.S. PATENT DOCUMENTS 5,686,177  11/1997  Yamanaka ................................ 428/332

FOREIGN PATENT DOCUMENTS

| 0 048 414 | 3/1982 | European Pat. Off. . |
| 0 152 269 | 8/1985 | European Pat. Off. . |
| 0 158 338 | 10/1985 | European Pat. Off. . |

OTHER PUBLICATIONS

Masayoshi Shinohara, Journal of Magnetism and Magnetic Materials 134(1994) 304–309, "High SNR perpendicular recording media".

E P Wohlfarth, J. Phys.F:Met.Phys.14(1984) L155–L159, Printed in Great Britain, "The coefficient of magnetic viscosity".

K. Yamanaka et al., Journal of Magnetism and Magnetic Materials 127(1993) 233–240, "Magnetic viscosity of oriented barium ferrite media".

*Primary Examiner*—Leszek Kiliman
*Attorney, Agent, or Firm*—Kenyon & Kenyon

[57] ABSTRACT

A perpendicular magnetic recording medium is provided by using a ferromagnetic polycrystalline thin film having main components of cobalt and chromium in which the coercivity is 1500 oersted or more and the fluctuation field of magnetic viscosity is 30 oersted or more; the film thickness is controlled within a range from 30 nm to 100 nm. A perpendicular magnetic recording medium with low noise and high output which is suited for high density recording can be obtained and a large capacity magnetic recording and reproducing apparatus can be provided by using this medium.

15 Claims, 8 Drawing Sheets

PERPENDICULAR MAGNETIC RECORDING MEDIA AND MAGNETIC RECORDING AND REPRODUCING APPARATUS USING THE SAME

BACKGROUND OF THE INVENTION

The present invention relates to a magnetic recording and reproducing apparatus used for an auxiliary storage of a computer and magnetic recording media used for it and more particularly to perpendicular magnetic recording media suitable for realizing a high recording density of 4 giga bits or more for a square inch and a magnetic recording and reproducing apparatus using them.

Due to progress of the information-oriented society, the information amount which is handled daily keeps on increasing. Along with it, there is an increasing need for a high recording density and a large storage capacity of magnetic recording apparatuses.

When the density of a magnetic recording apparatus is increased, the medium area for each recording bit is decreased, so that the reproduced output is lowered and the reproduction becomes difficult. To solve this problem, a method that recording and reproducing are executed by different heads and a head using a magneto-resistive effect having a high sensitivity is used as a reproduction head is used practically. To make the density higher, a head using a giant magneto-resistive effect having a higher sensitivity is examined. By use of such a highly sensitive reproduction head, the reproduced output can be increased, though the noise is also amplified at the same time and when a medium having a high noise is used, recorded information cannot be read. Therefore, for a magnetic recording medium for recording and reproducing data with high density, it is necessary to keep the medium noise lower.

In a longitudinal magnetic recording system used for a current magnetic disk, to reduce the medium noise, it is necessary to make crystal grains finer. Furthermore to overcome the demagnetizing field from the magnetic charge at the bit boundary and hold the magnetization in the recording direction, it is necessary to increase the coercivity, reduce the product of the thickness of the magnetic layer and the remanent magnetic flux density at the same time, and make the demagnetizing field smaller. To solve such a problem and achieve an areal recording density of 4 giga bits or more for a square inch, it is necessary to realize a coercivity of 3000 to 4000 oersted with a thickness of 10 to 20 nm of the magnetic layer and it is expected that the realization is technically difficult considerably. When crystal grains are made finer and the thickness of the magnetic layer is reduced, the thermal stability of the recorded magnetization state also becomes the matter.

On the other hand, the perpendicular magnetic recording system is characterized in that as the recording density increases, the demagnetizing field reduces and furthermore the thickness of the magnetic layer can be increased, so that the perpendicular magnetic recording system is considered to be a system suited to high density recording because the recorded magnetization state is thermally stable. To execute high speed recording and reproduction, even in the perpendicular magnetic recording system, it is a necessary condition to reduce the medium noise. Noise in perpendicular magnetic recording media is considered to depend on the size of the reversed magnetic domain in the recording bits and the size of disturbance at the recording bit boundary. To make those sizes smaller and reduce the noise, it is necessary to reduce the magnetization reversal unit by making the diameter of crystal grains of the magnetic film smaller.

The size of magnetization reversal unit is related also to the magnetic viscosity. Namely, it is considered that as the fluctuation field of magnetic viscosity increases, the magnetization reversal unit reduces and the medium noise also reduces. The meaning of the fluctuation field of magnetic viscosity is described in Journal of Physics F: Metal Physics, Vol. 14, p. L155 to L159 (1984). It is difficult to compare noise values of various media quantitatively and even in the same medium, the noise value to be measured varies with the head kind and the mutual relationship between the head and the medium. On the other hand, measurement of the fluctuation field of magnetic viscosity is simple and reproducible. It is described in Journal of Magnetism and Magnetic Materials, Vol. 127, p. 233 to 240 (1993) in detail.

Perpendicular magnetic recording media have been researched and developed mostly about continuous thin film type magnetic tapes. In this case, the thickness of the magnetic layer is as thick as 100 nm or more and a head with a wide track width is used for recording and reproduction, so that the reproduced output is large and it is not necessary to suppress the medium noise level so much. On the other hand, when a perpendicular magnetic recording medium is used as a magnetic disk, it is necessary to increase the density also in the track direction, so that the area of the recording bits reduces and a small output is reproduced by a highly sensitive head. As a result, the restriction to the medium noise becomes strict necessarily. Examination results relating to noise of perpendicular magnetic disk media are described in, for example, Journal of Magnetism and Magnetic Materials, Vol. 134, p. 304 to 309 (1994), which indicates that with respect to a CoCrTa perpendicular dual-layered film medium, medium S/N at 90 kFCI is 23.8 dB. Therefore, recording and reproduction with a high areal recording density of 4 giga bits or more for a square inch are considered to be difficult.

To increase medium S/N of a perpendicular magnetic recording medium, various films in which only the thickness of the magnetic layer is changed are manufactured by way of trial and the magnetic characteristic and the noise characteristic are evaluated by a vibrating sample magnetometer and a magnetic resistance effect type head respectively. Evaluation results are as shown below. When the film thickness is reduced so as to make the diameter of crystal grains smaller and reduce noise, the noise reduces almost in proportion to the film thickness, though the coercivity also reduces suddenly. As a result, the reproduced output reduces and a medium having a satisfactory S/N characteristic cannot be obtained. When the film thickness is increased so as to increase the output, the output tends toward saturation and does not increase so much, though the noise increases in proportion to the film thickness and S/N lowers. When the thickness of the magnetic layer is within a range from 50 nm to 150 nm, medium S/N shows a relatively high value but does not reach a level for reproducing a record with a high density of 4 giga bits or more for a square inch and reading information.

SUMMARY OF THE INVENTION

An object of the present invention is to provide a perpendicular magnetic recording medium which reduces noise with the output maintained, increases the fluctuation field of magnetic viscosity sufficiently, and has sufficiently high medium S/N suited to recording with a high density of 4 giga bits or more for a square inch and a magnetic recording and reproducing apparatus applying it.

A perpendicular magnetic recording medium conforming to the above object can be obtained by using a ferromagnetic thin film as a magnetic recording layer in which the coercivity measured with a magnetic field applied in the perpendicular direction to the film surface is 1500 oersted or more and the remanent magnetization coercivity measured with a magnetic field applied in the perpendicular direction to the film surface or the fluctuation field of magnetic viscosity at a magnetic field intensity equal to the coercivity is 30 oersted or more and by controlling the film thickness within a range from 30 nm to 100 nm.

To make the fluctuation field of magnetic viscosity 30 oersted or more, it is desirable to use an alloy film having main components of cobalt and chromium in which the mean value of diameter of crystal grains measured on a plane parallel with the film surface at a distance of less than 10 nm from the interface on the surface side of the aforementioned ferromagnetic thin film is 30 nm or less. The crystal grain size of the magnetic layer increases toward the surface side interface from the substrate side interface. Therefore, to control the size of crystal grains in the neighborhood of the surface side interface is important to obtain a perpendicular magnetic recording medium with low noise and high output. Or, it is effective to structure a magnetic recording layer with at least two magnetic layers which are separated by a non-magnetic interlayer or to use an underlayer which shows a para-magnetic characteristic or a magnetic characteristic close to the para-magnetic characteristic of less than 20 emu/cc which will not affect substantially the magnetic characteristic of a magnetic recording layer formed on the aforementioned underlayer.

One of the characteristics of the present invention is (1) a perpendicular magnetic recording medium using a ferromagnetic polycrystalline thin film having main components of cobalt and chromium in which the thickness of the magnetic recording layer is within a range from 30 nm to 100 nm, and the coercivity measured with a magnetic field applied in the perpendicular direction to the film surface of the magnetic recording layer is 1500 oersted or more, and the fluctuation field of magnetic viscosity at a magnetic field intensity equal to the coercivity or the remanent magnetization coercivity measured with a magnetic field applied in the perpendicular direction to the film surface at 25° C. is 30 oersted or more. When the fluctuation field is measured at 10° C. to 30° C., the fluctuation field is obtained as a value obtained by multiplying the temperature difference from 25° C. by 298 T (°K.)

(2) The mean value of diameter of crystal grains measured on a plane parallel with the film surface at a distance of less than 10 nm from the interface on the surface side of the aforementioned ferromagnetic thin film conforming to (1) is 30 nm or less.

(3) When the magnetic recording layer described in (1) comprises at least two magnetic layers which are separated by a non-magnetic interlayer, it has a more superior effect. However, in this case, it is suitable for obtaining a high S/N medium to control the thickness of the magnetic recording layer within a range from 75 nm to 100 nm in total.

(4) As an underlayer f the magnetic recording layer described in (1), a polycrystalline film having main components of cobalt and chromium which shows a para-magnetic characteristic or a magnetic characteristic close to the para-magnetic characteristic may be used or a polycrystalline film having main components of cobalt and chromium which contains 55 to 75 atomic percent of cobalt.

(5) Another characteristic of the present invention is a magnetic recording and reproducing apparatus in which the magnetic recording medium described in (1) to (4) is used as the aforementioned magnetic recording medium in a magnetic recording apparatus having a magnetic recording medium, a magnetic recording medium drive unit, a magnetic head, a magnetic head drive unit, and a recording and reproducing signal processing system, and the reproduction unit of the magnetic head comprises a magnetic pole, a magneto-resistive effect type magnetic head using the magneto-resistive effect, or a giant magneto-resistive effect type magnetic head, and the distance from the magnetic recording layer surface of the magnetic recording medium to the magnetic pole surface of the magnetic head is 50 nm or less at the time of recording and reproduction.

DETAILED DESCRIPTION OF THE PREFERRED EMBODIMENTS

Figure 1:
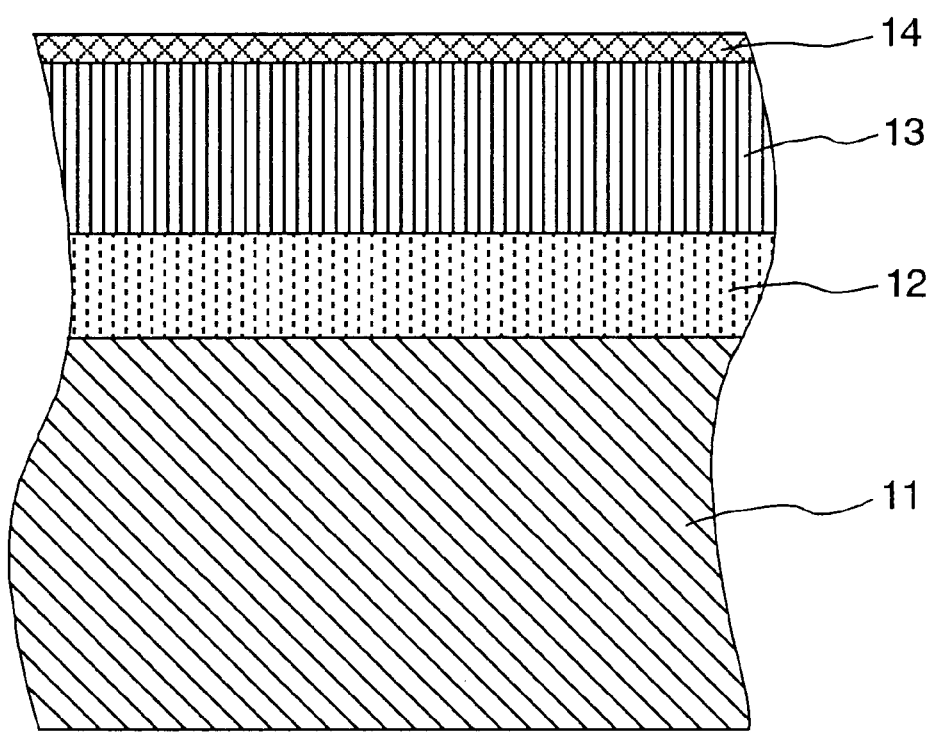
FIG. 1 is a drawing showing the structure of the basic section of the perpendicular magnetic recording medium of the present invention.

FIG. 1 shows a basic schematic view of the perpendicular magnetic recording medium of the present invention. In FIG. 1, numeral 11 indicates a non-magnetic substrate such as a tempered glass, silicone, carbon, ceramics, titanium alloy, organic resin, or Ni-P alloy plated aluminum alloy substrate. Numeral 12 indicates an underlayer of titanium or titanium alloy or a dual-layered underlayer having a polycrystalline film composed of alloy having main components of cobalt and chromium which shows a para-magnetic characteristic or a magnetic characteristic close to the para-magnetic characteristic between the aforementioned underlayer and the magnetic recording layer. Numeral 13 indicates a magnetic recording layer composed of main components of cobalt and chromium of single-layer structure or multilayer structure separated by a non-magnetic interlayer using a ferromagnetic thin film of, for example, Co—Cr—Ta, Co—Cr—Pt, Co—Cr—Nb, or Co—Cr—W. Numeral 14 indicates a protective lubricant layer comprising a protective film of carbon, silicon-carbon, or boron-carbon and an organic lubricant film.

Embodiment 1

A film is formed on a 2.5 inch tempered glass substrate having a substrate surface roughness Ra of 3 nm or less by the DC magnetron sputtering method. The film forming conditions are that the ultimate degree of vacuum in the sputtering apparatus is 1/10000000000 toll or less, and the discharge argon gas pressure is 3/1000 toll, and the substrate temperature is 230° C., and the input power is 1 kW for a 6 inch target. As an underlayer, a Ti-10 atomic % Cr film is formed in a thickness of 30 nm and as a magnetic recording layer, a Co-17 atomic % Cr-4 atomic % Ta film is formed by changing the thickness thereof within a range from 10 nm to 300 nm. As a protective lubricant layer, a carbon film is formed in a thickness of 5 nm and an organic lubricant film is formed in a thickness of 5 nm. To reduce the medium noise, as a magnetic recording layer, a dual-layered film is formed by dividing a magnetic layer in two by a Ti-10 atomic % Cr film with a thickness of 3 nm at the center thereof.

The coercivity and thermal fluctuation of magnetic viscosity are measured with these films which are cut into pieces of 8 mm square by a vibrating sample magnetometer at room temperature. Both characteristics are measured with a magnetic field applied in the perpendicular direction to the film surface. The reproduced output and medium noise are recorded by an inductive type head having a gap length of 0.2 μm, a track width of 1 μm, and a number of turns of 20 and reproduced by a magneto-resistive type head having a shield length of 0.2 μm and a track width of 0.9 μm. With respect to the reproduced output, an isolated wave output at a linear recording density of 2 kFCI is measured and evaluated and with respect to the medium noise, an integrated noise at 0 to 50 MHz when 300 kFCI is recorded is measured and evaluated. The magnetic spacing between the head and the medium is 40 nm.

With respect to the fluctuation field of magnetic viscosity, the measurement principle thereof will be explained hereunder. When a new magnetic field is applied to a magnetic material, the magnetization I(t) of the magnetic material often varies in the relationship of:

$$I(t) = \text{constant} + S \times ln(t)$$

for a logarithm of ln(t) of the magnetic field application time, where I(t) indicates a magnetic moment per unit volume and t indicates an elapsed time after the new magnetic field is applied. S is called a viscosity coefficient and has a positive value when the magnetic field is shifted and applied in the positive direction and a negative value when the magnetic field is shifted and applied in the negative direction. It is known that S can be expressed by a product of the irreversible susceptibility $x_{irr}$ and the fluctuation field $H_f$. Namely, the relationship of:

$$S = x_{irr} \times H_f$$

is held. Therefore, if S and $x_{irr}$ are obtained from an experiment, the fluctuation field can be obtained. The fluctuation field in a location where the magnetic field intensity is equal to the coercivity Hc or the remanence coercivity Hr can be obtained also from the magnetic field application time dependency thereof. The coercivity or the remanence coercivity often lowers in the relationship of:

$$Hc \text{ (or } Hr) = -A \times ln(t) + \text{constant}$$

as the magnetic field application time t increases. In such a case, A indicates a value similar to the fluctuation field in a location where the magnetic field intensity is equal to the coercivity or the remanence coercivity. This method is simple and reproducible. Therefore, in the present invention, the value of A is used as the fluctuation field.

Figure 2:
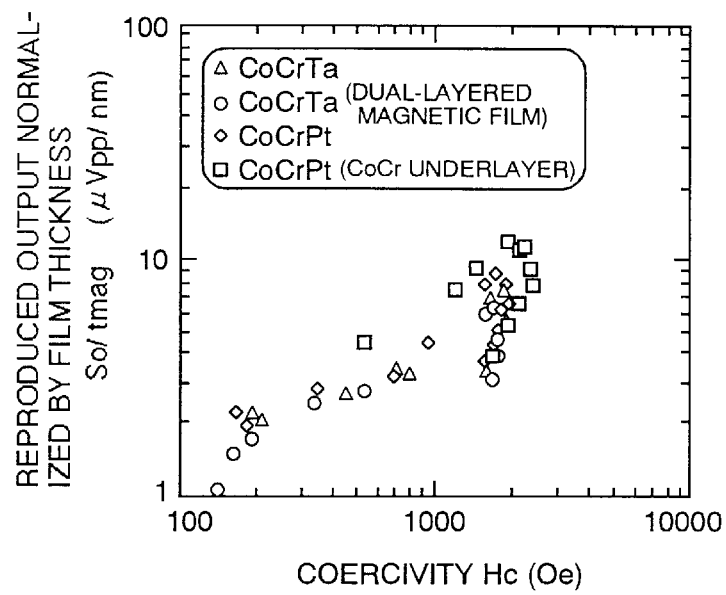
FIG. 2 is a drawing showing the coercivity and the reproduced output normalized by thickness.
Figure 3:
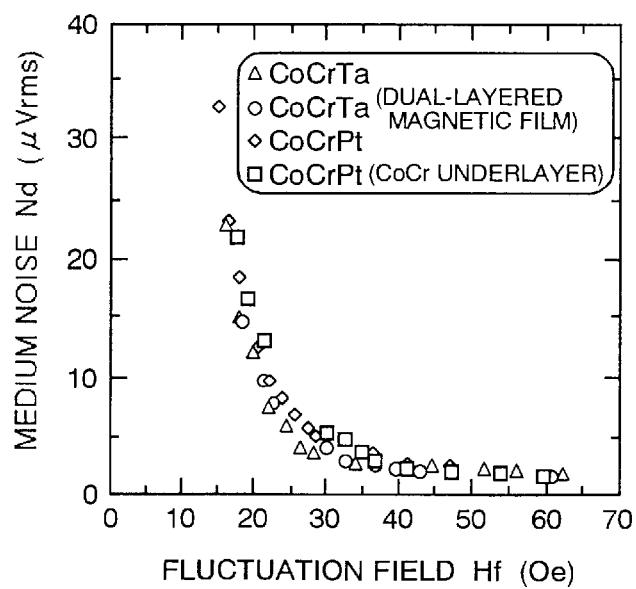
FIG. 3 is a drawing showing the relationship between the fluctuation field and the medium noise.
Figure 4:
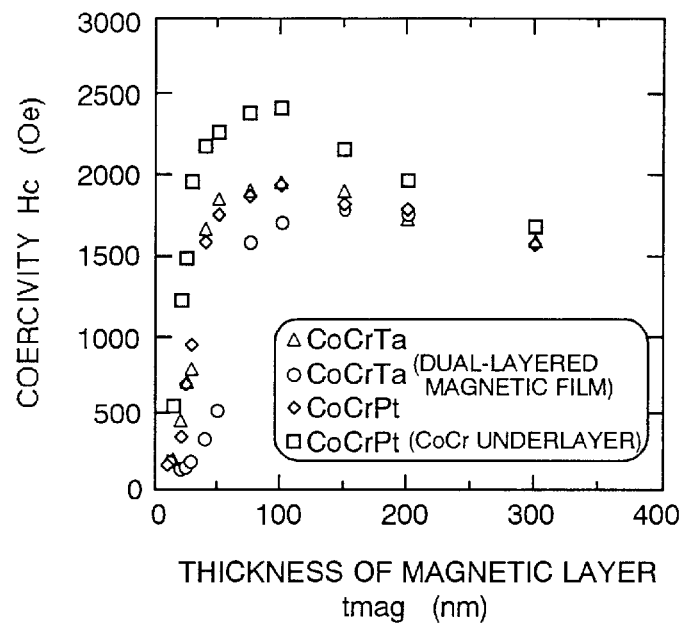
FIG. 4 is a drawing showing the relationship between the thickness of magnetic layer and the reproduced output.
Figure 5:
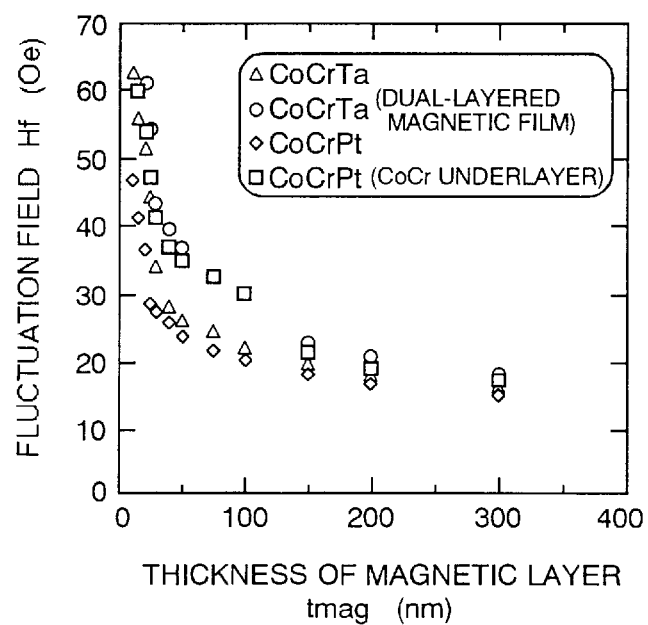
FIG. 5 is a drawing showing the relationship between the thickness of magnetic layer and the medium noise.
Figure 6:
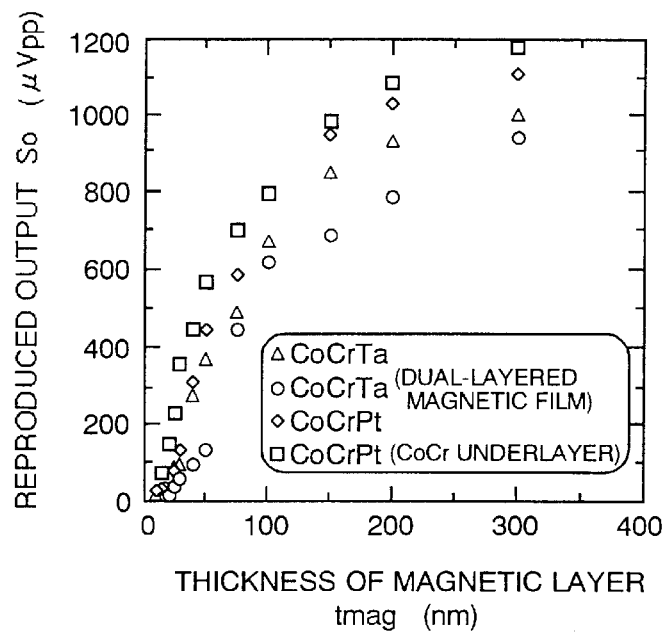
FIG. 6 is a drawing showing the relationship between the thickness of magnetic layer and the coercivity.
Figure 7:
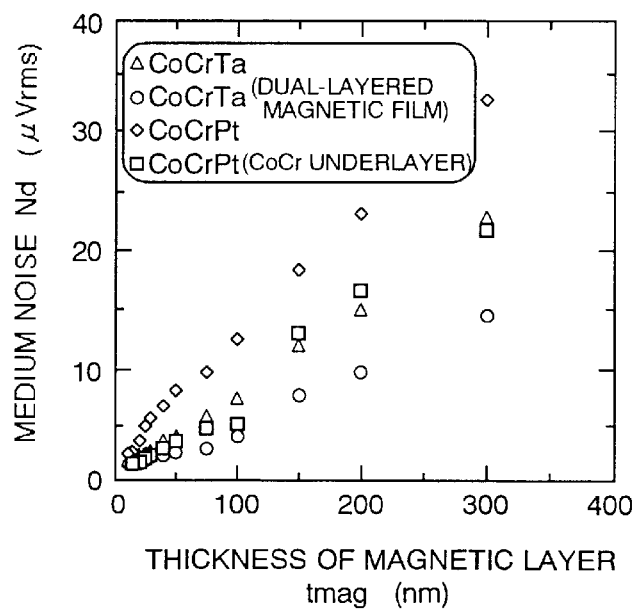
FIG. 7 is a drawing showing the relationship between the thickness of magnetic layer and the fluctuation field.

FIGS. 2 and 3 show results when the relationship between the magnetic characteristic and the electromagnetic conversion characteristic of all the media prepared in Embodiments 1 and 2 is plotted. The measured result of the electromagnetic conversion characteristic greatly varies with a slight difference in the head and measurement conditions, though the magnetic characteristic such as the coercivity or the fluctuation field can be measured simply and stable measured values can be obtained, so that it is effective in comparison of media and selection of medium material and constitution. Therefore, it is important to know these relationships. FIG. 2 shows that in a perpendicular magnetic recording medium, the reproduced output is proportional to the 0.4 to 0.5 power of the coercivity. Namely, when the coercivity becomes smaller, the reproduced output becomes smaller suddenly. FIG. 3 shows that the medium noise correlates closely with the fluctuation field. Namely, to prepare a medium with small noise, it is necessary to use a ferromagnetic thin film with a large fluctuation field.

Figure 8:
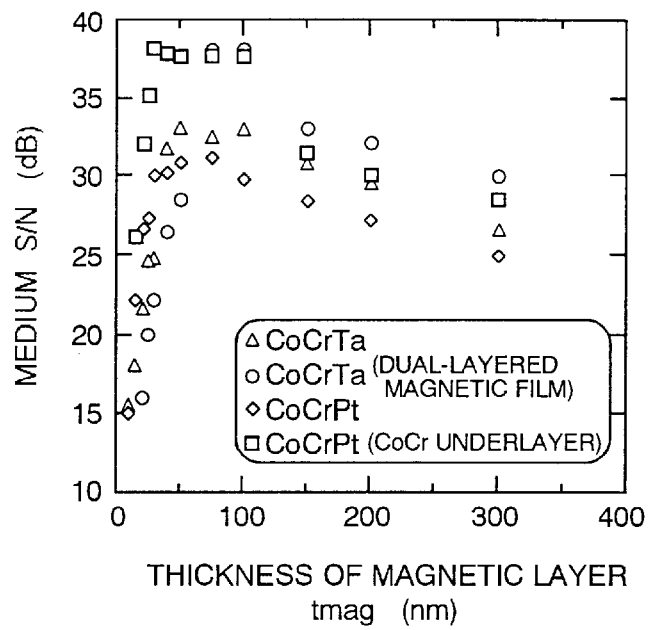
FIG. 8 is a drawing showing the relationship between the thickness of magnetic layer and medium S/N.
Figure 9:
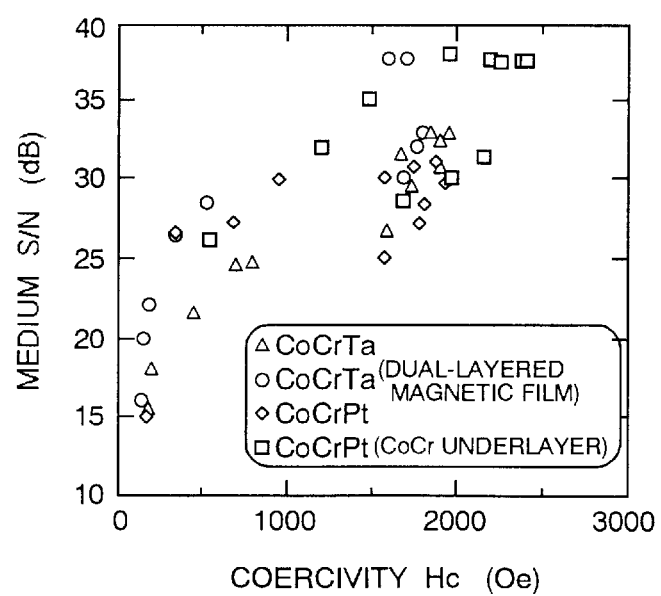
FIG. 9 is a drawing showing the relationship between the coercivity and medium S/N.
Figure 10:
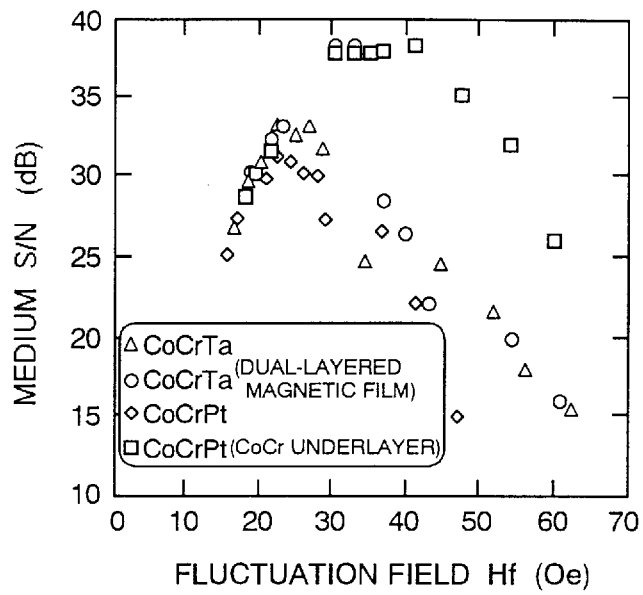
FIG. 10 is a drawing showing the relationship between the fluctuation field and medium S/N.

The coercivity, fluctuation field, reproduced output, medium noise, and medium S/N of media in which the thickness of the magnetic layer is changed are shown in FIGS. 4 to 8 respectively. When the film thickness is reduced, the fluctuation field increases and the noise reduces, though the coercivity reduces and the reproduced output reduces suddenly, so that an optimum value of S/N exists when the film thickness is within a range from 30 nm to 100 nm. When the magnetic recording layer is a single layer of CoCrTa, S/N of 33 dB at most is obtained. However, when it is a dual layer via a non-magnetic interlayer, high S/N of 37 dB or more is obtained when the film thickness is within a range from 75 nm to 100 nm. In a medium with a film thickness of less than 75 nm, the coercivity is less than 1500 oersted and in a medium with a film thickness of more than 100 nm, the fluctuation field is less than 30 oersted. FIGS. 9 and 10 show respectively that the coercivity and fluctuation field of a ferromagnetic thin film used to prepare a high S/N medium have appropriate ranges.

In addition to the medium in which a Ti-10 atomic % Cr film is formed in a thickness of 30 nm as an underlayer, even if a medium in which a Co-35 atomic % Cr film showing a para-magnetic characteristic is formed in a thickness of 20 nm moreover between the aforementioned medium and the magnetic recording layer is used, the same result as the aforementioned can be obtained.

Embodiment 2

A perpendicular magnetic recording medium using a Co-19 atomic % Cr-10 atomic % Pt film as a magnetic recording layer is prepared by the same method as that of Embodiment 1. The range of film thickness, substrate, and film constitution are the same as those of Embodiment 1, though a medium in which a Co-35 atomic % Cr film showing a para-magnetic characteristic is formed in a thickness of 20 nm as an underlayer is prepared.

The magnetic characteristic and the electromagnetic conversion characteristic are measured also with these media in the same way as with Embodiment 1 and the results are shown in the same drawings. The magnetic layer thickness dependency of each characteristic is shown in FIGS. 4 to 8. In the dual-layered underlayer, the coercivity increases particularly when the film thickness is within a small range and the reproduced output is increased. At the same time, the fluctuation field is increased, and the noise is reduced, and S/N is increased substantially. FIG. 8 shows that S/N is as high as 37 dB when the film thickness is within a range from 30 nm to 100 nm, and FIG. 9 shows that the coercivity is required to be 1500 oersted or more, and FIG. 10 shows that the fluctuation field is required to be 30 oersted or more.

Figure 11:
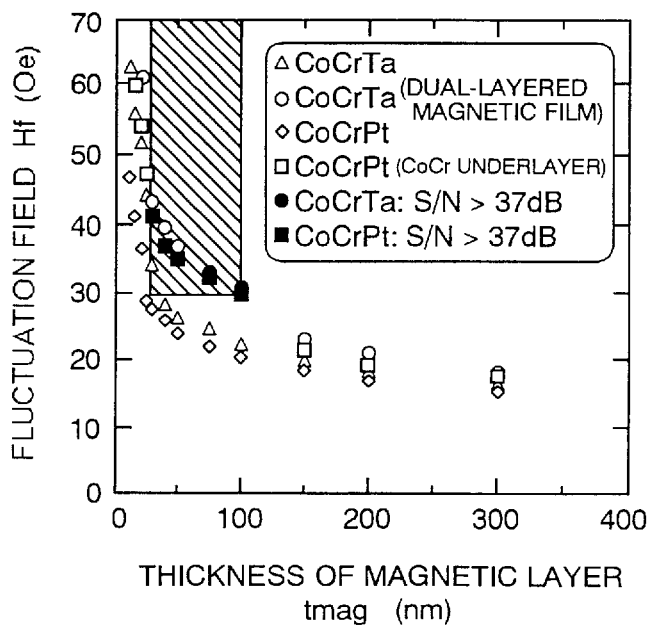
FIG. 11 is a drawing showing the relationship among the thickness of magnetic layer, the fluctuation field, and medium S/N.
Figure 12:
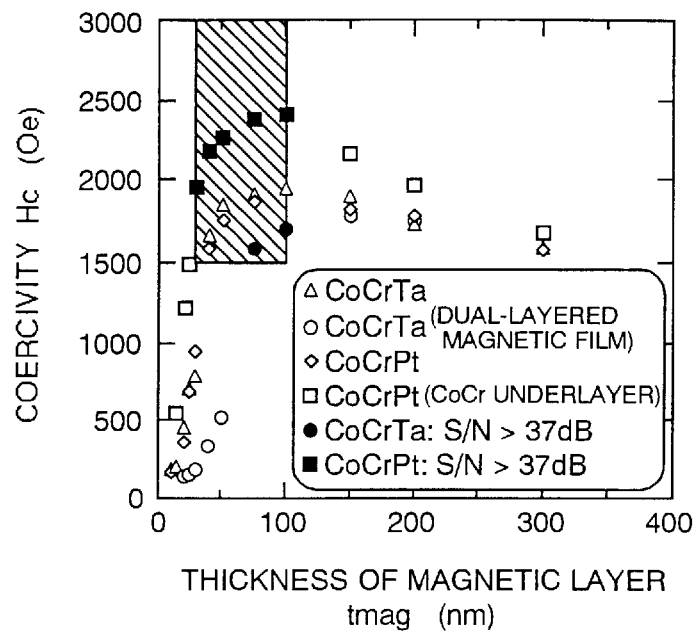
FIG. 12 is a drawing showing the relationship among the thickness of magnetic layer, the coercivity, and medium S/N.
Figure 13:
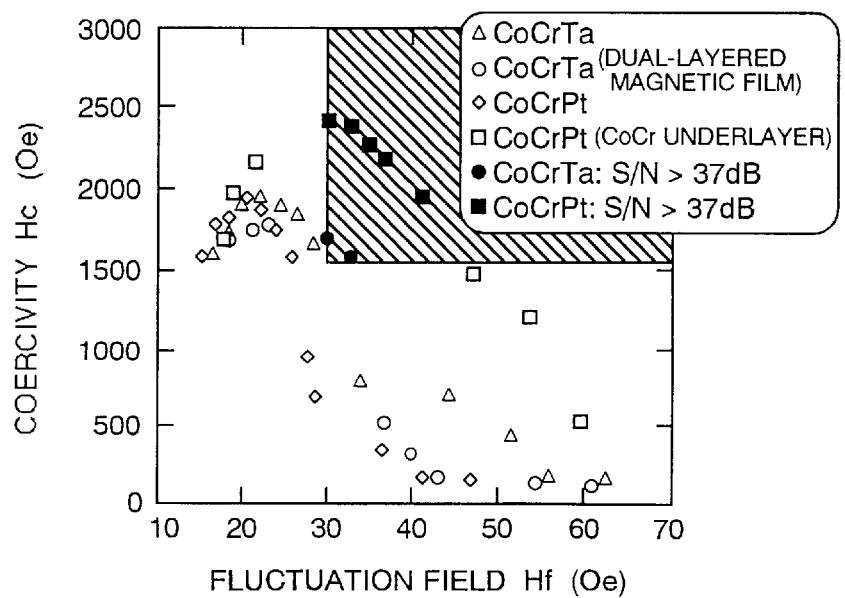
FIG. 13 is a drawing showing the relationship among the fluctuation field, the coercivity, and medium S/N.

FIGS. 11 to 13 show results when the relationship in a medium with S/N of 37 dB or more is distinguished and plotted in the relationship among the film thickness, coercivity, and fluctuation field. These drawings show an optimum range of each parameter.

To check differences between a medium with high S/N and a medium with low S/N more in detail, the structure of each film is observed under a transmission electron microscope. In the medium with S/N of 37 dB or more, the mean value of diameter of crystal grains at a distance of 10 nm at the upper part of the magnetic layer thereof is 30 nm or less, and particularly when the magnetic layer is dual-layered, crystal grains are made finer and this is considered to be useful for reduction in noise. The medium using a dual-layered underlayer is observed to have the clear grain boundaries, and comparatively uniform grain diameters, and is considered to be structured so that the magnetization can inverse uniformly and smoothly during magnetic recording.

To ascertain the effect of this dual-layered underlayer, when same media as the aforementioned one are prepared by changing the cobalt content of a CoCr alloy underlayer from 50 atomic % to 80 atomic %, S/N is 75 dB or more when the cobalt content is within a range from 55 atomic % to 75 atomic % and when the cobalt content is beyond the range, S/N is as low as 34 dB at maximum. To prevent the recording layer from a bad magnetic effect, by using the para-magnetic CoCr alloy underlayer it is considered that the cobalt content is required to be 75 atomic % or less. When the cobalt content is 55 atomic % or less, the C-axis orientation of the CoCr underlayer and the recording layer is bad and it is considered that S/N reduces due to disturbance of the crystallization.

Embodiment 3

Figure 14:
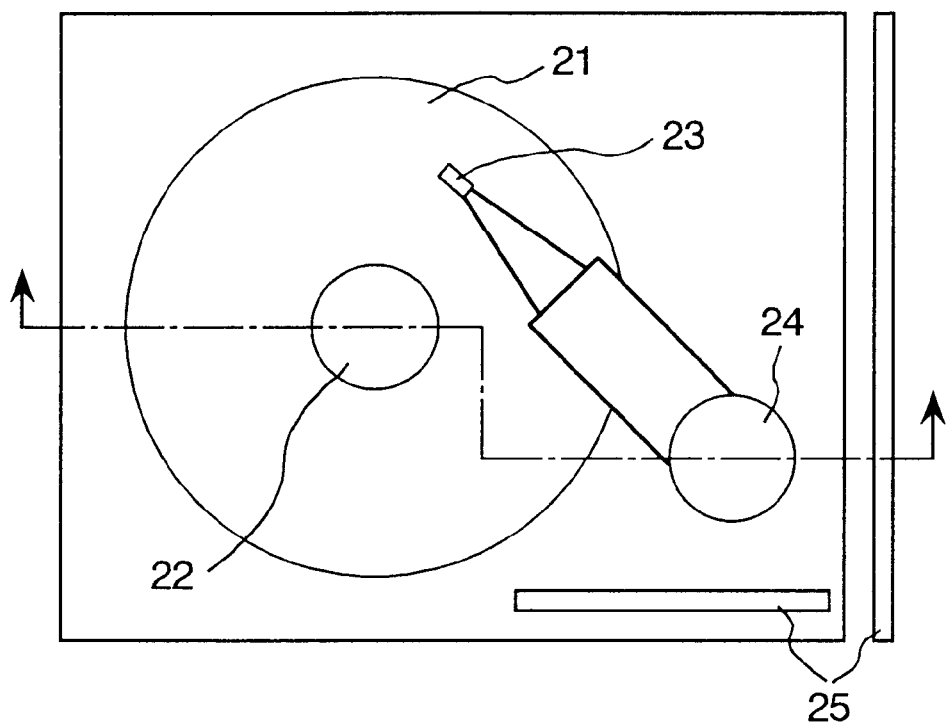
FIG. 14 is a drawing showing the structure of a magnetic recording and reproducing apparatus of an embodiment of the present invention.
Figure 14:
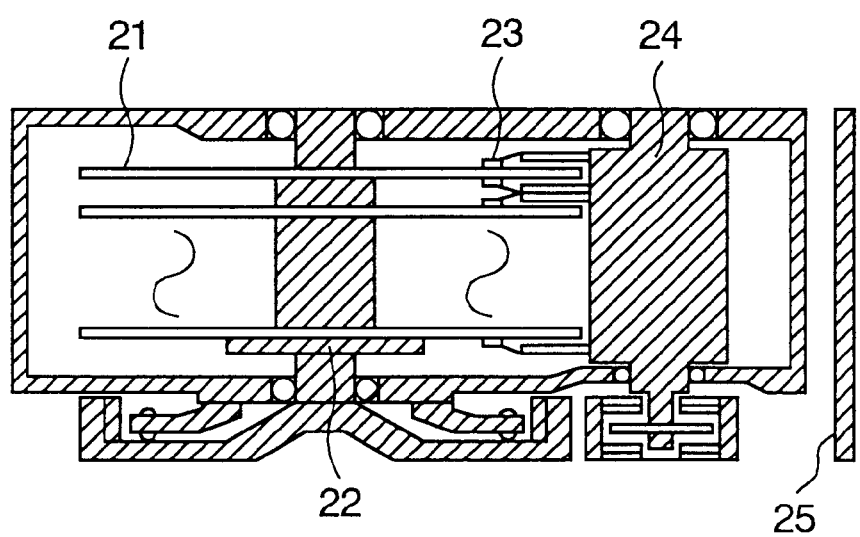

Media with medium S/N of 37 dB or more are selected from the perpendicular magnetic recording media prepared in Embodiments 1 and 2 and a magnetic disk unit using them is prepared. The structure thereof is shown in FIG. 14. A same head as those used in Embodiments 1 and 2 is used and the magnetic spacing between the head and the medium is adjusted to 50 nm or less. As a result, it can be ascertained that information can be recorded and reproduced in an areal recording density of 4 giga bits or more for a square inch. On the other hand, when a medium with medium S/N of less than 37 dB is used, information cannot be reproduced in a high recording density and when the magnetic spacing between the head and the medium is adjusted to more than 50 nm, the resolution is not sufficient and information can neither be read in a high recording density.

Effects of the Invention

Perpendicular magnetic recording media with low noise and high output which are suited to high density recording and a large capacity magnetic recording and reproducing apparatus can be provided.

What is claimed is:

1. A perpendicular magnetic recording medium having a magnetic recording layer, said magnetic recording layer comprising a ferromagnetic polycrystalline thin film including cobalt and chromium, the thickness of said magnetic recording layer being within a range from 30 nm to 100 nm, and the coercivity, measured with a magnetic field applied in the perpendicular direction to the film surface of said magnetic recording layer, being 1500 oersted or more, and the fluctuation field of magnetic viscosity at a magnetic field intensity equal to said coercivity or the remanence coercivity measured with a magnetic field applied in the perpendicular direction to said film surface at 25° C. being more than 30 oersted.

2. A perpendicular magnetic recording medium according to claim 1, wherein the mean value of the diameter of the crystal grains measured on a plane parallel with the film surface at a distance of less than 10 nm from the interface on the surface side of said ferromagnetic polycrystalline thin film is 30 nm or less.

3. A perpendicular magnetic recording medium according to claim 1, wherein said magnetic recording layer comprises at least two magnetic layers which are separated by a non-magnetic interlayer and the thickness thereof is within a range from 75 nm to 100 nm in total.

4. A perpendicular magnetic recording medium according to claim 1, wherein an underlayer of said magnetic recording layer comprises a polycrystalline film including cobalt and chromium which has a para-magnetic characteristic of less than 20 emu/cc.

5. A perpendicular magnetic recording medium according to claim 4, wherein said underlayer of said magnetic recording layer further comprises 55 to 75 atomic percent of cobalt.

6. A magnetic recording and reproducing apparatus having a perpendicular magnetic recording medium, a magnetic recording medium drive unit, a magnetic head, a magnetic head drive unit, and a recording and reproducing signal processing system, said perpendicular magnetic recording medium composed of a ferromagnetic polycrystalline thin film including cobalt and chromium in which the thickness of a magnetic recording layer is within a range from 30 nm to 100 nm, and the coercivity measured with a magnetic field applied in the perpendicular direction to the film surface of said magnetic recording layer is 1500 oersted or more, and the fluctuation field of magnetic viscosity at a magnetic field intensity equal to said coercivity or the remanence coercivity measured with a magnetic field applied in the perpendicular direction to said film surface at 25° C. is more than 30 oersted wherein the reproduction unit of said magnetic head has a magneto-resistive effect magnetic head or a giant magneto-resistive effect magnetic head and the distance from the magnetic recording layer surface of said magnetic recording medium to the magnetic pole surface of said magnetic head is 50 nm or less at the time of recording and reproduction.

7. A magnetic recording and reproducing apparatus according to claim 6, wherein the mean value of diameter of crystal grains measured on a plane parallel with the film surface at a distance of less than 10 nm from the interface on the surface side of said ferromagnetic crystalline thin film is 30 nm or less.

8. A magnetic recording and reproducing apparatus according to claim 6, wherein said magnetic recording layer comprises at least two magnetic layers which are separated by a non-magnetic interlayer and the thickness thereof is within a range from 75 nm to 100 nm in total.

9. A magnetic recording and reproducing apparatus according to claim 6, wherein an underlayer of said magnetic recording layer comprises a polycrystalline film including cobalt and chromium which has a para-magnetic characteristic of less than 20 emu/cc.

10. A magnetic recording and reproducing apparatus according to claim 9, wherein an underlayer of said magnetic recording layer comprises a polycrystalline film including cobalt and chromium which contains 55 to 75 atomic percent of cobalt.

11. A magnetic disk having a perpendicular magnetic recording layer, said magnetic recording layer comprising a ferromagnetic polycrystalline thin film including cobalt and chromium, the thickness of said magnetic recording layer being within a range from 30 nm to 100 nm, and the coercivity, measured with a magnetic field applied in the perpendicular direction to the film surface of said magnetic recording layer, being 1500 oersted or more, and the fluctuation field of magnetic viscosity at a magnetic field intensity equal to said coercivity or the remanence coercivity measured with a magnetic field applied in the perpendicular direction to said film surface at 25° C. being more than 30 oersted.

12. A magnetic disk according to claim 11, wherein the mean value of the diameter of the crystal grains measured on a plane parallel with the film surface at a distance of less than 10 nm from the interface on the surface side of said ferromagnetic polycrystalline thin film is 30 nm or less.

13. A magnetic disk according to claim 11, wherein said magnetic recording layer comprises at least two magnetic layers which are separated by a non-magnetic interlayer and the thickness thereof is within a range from 75 nm to 100 nm in total.

14. A magnetic disk according to claim 11, wherein an underlayer of said magnetic recording layer comprises a polycrystalline film including cobalt and chromium which has a para-magnetic characteristic of less than 20 emu/cc.

15. A magnetic disk according to claim 14, wherein said underlayer of said magnetic recording layer further comprises 55 to 75 atomic percent of cobalt.

* * * * *